United States Patent
Ghannam et al.

(10) Patent No.: US 11,568,193 B2
(45) Date of Patent: Jan. 31, 2023

(54) RFID SYSTEM THAT INCLUDES A HYBRID RFID TAG

(71) Applicants: Ford Global Technologies, LLC, Dearborn, MI (US); Michigan State University, East Lansing, MI (US)

(72) Inventors: Mahmoud Yousef Ghannam, Canton, MI (US); Mark A. Cuddihy, New Boston, MI (US); Prem Chahal, East Lansing, MI (US); Saikat Mondal, East Lansing, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 17/210,369

(22) Filed: Mar. 23, 2021

(65) Prior Publication Data

US 2022/0309307 A1    Sep. 29, 2022

(51) Int. Cl.
*G06K 19/07*     (2006.01)
*G06K 7/00*      (2006.01)
(Continued)

(52) U.S. Cl.
CPC ....... *G06K 19/0723* (2013.01); *G06K 7/0004* (2013.01); *G06K 7/081* (2013.01); *G06K 7/10099* (2013.01); *G06K 7/10198* (2013.01)

(58) Field of Classification Search
None
See application file for complete search history.

(56) References Cited

U.S. PATENT DOCUMENTS

| 7,202,789 B1 | 4/2007 | Stilp |
| 7,786,864 B1 | 8/2010 | Shostak et al. |

(Continued)

FOREIGN PATENT DOCUMENTS

| CA | 2811975 A1 * | 11/2011 | ........... A61B 5/0031 |
| EP | 3327631 A1 * | 5/2018 | ......... G06K 19/0701 |

(Continued)

OTHER PUBLICATIONS

Amouzegar et al. "Vehicle Maintenance Notification System Using RFID Technology" International Journal of Computer Theory and Engineering, vol. 5, No. 2 (Apr. 2013) pp. 312-316.
(Continued)

*Primary Examiner* — Fekadeselassie Girma
(74) *Attorney, Agent, or Firm* — Frank Lollo; Eversheds Sutherland (US) LLP (57) ABSTRACT

This disclosure is generally directed to an RFID system that includes a hybrid RFID tag offering a functionality of a passive RFID tag and an active RFID tag. When operating as a passive RFID tag, an RF signal received from an RFID reader is harvested to produce a DC voltage for powering the hybrid RFID tag. The harvested DC voltage is coupled into a capacitor at a slow-charging rate so as to avoid a capacitor inrush current causing an abrupt power supply voltage drop. A controller chip in the hybrid RFID tag can execute some RFID functions at this time, thereby speeding up a response to the RFID reader. The capacitor is then charged at a fast-charging rate for storing a reserve charge. The hybrid RFID tag can subsequently use the reserve charge to operate as an active RFID tag without waiting for an RF signal from the RFID reader.

17 Claims, 6 Drawing Sheets

(51) Int. Cl.
*G06K 7/10* (2006.01)
*G06K 7/08* (2006.01)

(56) References Cited

U.S. PATENT DOCUMENTS

| | | | | |
|---|---|---|---|---|
| 7,873,326 | B2* | 1/2011 | Sadr | H01Q 21/29 |
| | | | | 370/335 |
| 8,890,657 | B2* | 11/2014 | Lin | G06F 3/012 |
| | | | | 340/572.1 |
| 10,140,486 | B1* | 11/2018 | Lavery | G06K 19/0723 |
| 10,140,829 | B1* | 11/2018 | Calvarese | G08B 13/246 |
| 10,567,941 | B2* | 2/2020 | Jiang | H04W 4/80 |
| 10,827,451 | B2* | 11/2020 | Mudulodu | H04B 17/391 |
| 10,976,408 | B2* | 4/2021 | Koch | G01S 13/878 |
| 11,127,278 | B2* | 9/2021 | Freedman | G16H 40/20 |
| 2009/0322489 | A1* | 12/2009 | Jones | G06V 20/52 |
| | | | | 340/10.3 |
| 2010/0207738 | A1* | 8/2010 | Bloy | G08B 13/2462 |
| | | | | 342/368 |
| 2012/0075101 | A1* | 3/2012 | Austin | G01P 13/00 |
| | | | | 340/572.1 |
| 2017/0220787 | A1* | 8/2017 | Inokuchi | G06F 21/32 |
| 2019/0034855 | A1* | 1/2019 | Halioris | G06Q 10/1091 |
| 2019/0079176 | A1* | 3/2019 | Weissman | G01S 13/751 |
| 2019/0204437 | A1* | 7/2019 | Park | G01S 13/584 |
| 2019/0392274 | A1* | 12/2019 | Louzir | G06K 19/0723 |
| 2022/0309307 | A1* | 9/2022 | Ghannam | G06K 19/0723 |

FOREIGN PATENT DOCUMENTS

| | | | | |
|---|---|---|---|---|
| EP | 3413241 | A1 * | 12/2018 | G06K 19/0675 |
| TW | 201019628 | A * | 5/2010 | H04B 5/02 |

OTHER PUBLICATIONS

Mahesh, Poornima, et al. "RFID Based In-Vehicle Road Sign Notification System" International Journal of Engineering Research & Technology, pp. 240-243.

* cited by examiner

RFID SYSTEM THAT INCLUDES A HYBRID RFID TAG

BACKGROUND

A radio-frequency identification (RFID) system may be used to keep track of various objects such as, for example, packages stored in a warehouse, packages being transported, and products in a store. An RFID system typically includes an RFID reader that wirelessly communicates with individual RFID tags attached to each of the tracked objects. RFID tags can be broadly classified under two categories—active RFID tags and passive RFID tags.

An active RFID tag typically includes an antenna, an integrated circuit (IC) and a battery that provides power to the IC. The active RFID tag can transmit a radio-frequency (RF) signal to the RFID reader at any time. In an example scenario, an active RFID tag that is attached to an object may be configured as a "beacon" that transmits an RF signal to an RFID reader at various times without waiting to hear from the RFID reader. The RFID reader may track a movement of the object based on the RFID signal received from the active RFID tag.

A passive RFID tag typically includes an antenna and an IC as well. The passive RFID tag does not include a battery and derives power for operating the IC, by harvesting energy from an RF signal transmitted by the RFID reader.

The passive RFID tag provides certain advantages over the active RFID tag such as, for example, in terms of cost. However, the absence of a battery in the passive RFID tag leads to certain trade-offs being made in some cases. For example, in some cases, an undesirable time delay may occur before a passive RFID tag provides a response to an RF signal received from an RFID reader. The time delay may be attributed to an amount of time that an energy harvesting circuit may take before harvesting and providing adequate power to the IC to operate. It is therefore desirable to address this shortcoming as well as other shortcomings that may be associated with a passive RFID tag, while simultaneously retaining certain benefits offered by the passive RFID tag.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, certain embodiments described in this disclosure are directed to an RFID system that includes a hybrid RFID tag. The hybrid RFID tag offers a functionality of a passive RFID tag and a functionality of an active RFID tag as well. When operating as a passive RFID tag, an RF signal received from an RFID reader is harvested to produce a DC voltage for powering the hybrid RFID tag. The harvested DC voltage is coupled into a capacitor at a slow-charging rate so as to avoid a capacitor inrush current causing an abrupt power supply voltage drop. A controller chip in the hybrid RFID tag can execute some RFID functions at this time, thereby speeding up a response to the RFID reader. The capacitor is then charged at a fast-charging rate for storing a reserve charge. The hybrid RFID tag can subsequently use the reserve charge to operate as an active RFID tag in the absence of an RF signal from the RFID reader. When operating as an active RFID tag, the RFID tag may receive a signal from a sensor such as, for example, a sensor attached to an object in a vehicle.

In an example implementation, the object may be a seat that is one of several seats detachably mounted in the vehicle. An owner of the vehicle may decide to detach and remove the seat from the vehicle for any of various reasons such as, for example, to make room for transporting luggage. The sensor detects the removal of the seat and sends a sensor signal to the hybrid RFID tag. Upon receiving the sensor signal, the RFID tag uses the reserve charge in the capacitor to power up and transmit an RF signal to the RFID reader for informing the RFID reader of the seat removal.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and phrases should be interpreted as referring to various objects and actions that are generally understood in various forms and equivalencies by persons of ordinary skill in the art. For example, it must be understood that the word "hybrid" as used herein refers to an object having an ability to perform different functions at different times. For example, a hybrid vehicle is one that can operate by using an electric motor at one time and by using a gasoline engine at another time. More particularly, the phrase "hybrid RFID tag" as used herein refers to an RFID tag that performs certain RFID functions by harvesting an RF signal transmitted by an RFID reader over a first period of time, and performs RFID functions over a subsequent period of time (when the RF signal is no longer present) by using a charge stored in an onboard capacitor. The phrase "RF signal" as used herein encompasses signals of various frequencies in various frequency bands (VHF, UHF, and microwave, for example). Words such as "module," "circuit," "device, "component," "element" may be used interchangeably in this disclosure and generally indicate various types of components such as, for example, active electronic components (transistors, integrated circuits, etc.) and passive components (capacitors, resistors, etc.) that are interconnected to each other so as to perform various operations. Words such as "charge," "voltage," and "current" may be used herein with reference to various forms of electric energy. Words such as "line" and "link" may be used interchangeably to indicate various signal/power propagating elements (such as, for example, wires and metal tracks on a printed circuit board) in some cases, and may also be used to indicate over-the-air wireless signal propagation in some other cases. The word "level" as used herein must be interpreted in the context in which used. For example, when used with reference to a voltage, the word must be understood as referring to an amplitude of the voltage, and when used with reference to a charge stored in a capacitor, the word must be understood as referring to an "amount" of charge stored in the capacitor. It should be understood that the word "example" as used herein is intended to be non-exclusionary and non-limiting in nature.

Figure 1:
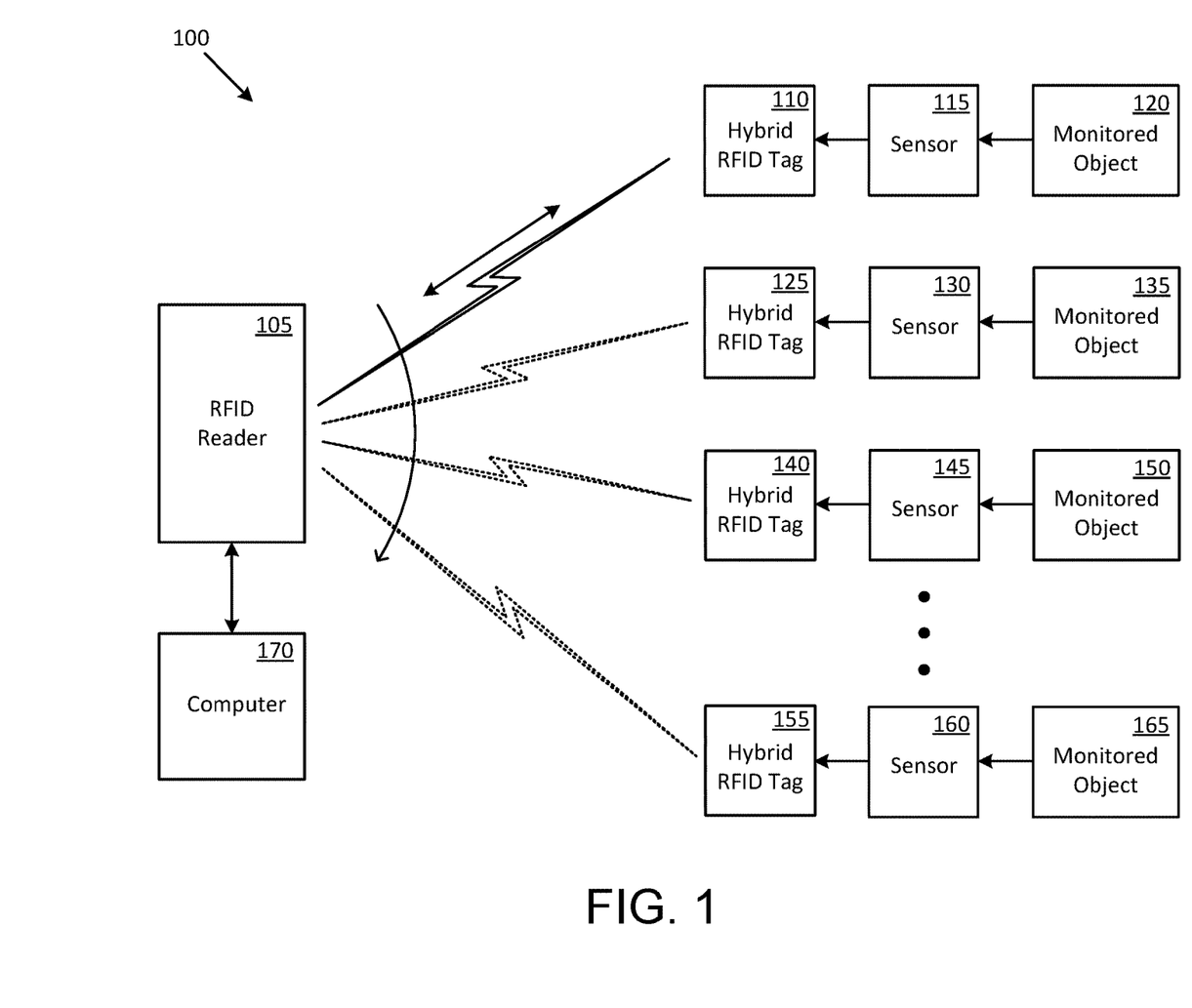
FIG. 1 illustrates a first mode of operation of an example RFID system in accordance with an embodiment of the disclosure.

FIG. 1 illustrates a first mode of operation of an example radio-frequency identification (RFID) system 100 in accordance with an embodiment of the disclosure. The example RFID system 100 can include an RFID reader 105 that is coupled to a computer 170. The RFID reader 105 is configured to wirelessly communicate with "n" hybrid RFID tags (n≥1). In the illustrated example, the "n" hybrid RFID tags include a hybrid RFID tag 110, a hybrid RFID tag 125, a hybrid RFID tag 140, and a hybrid RFID tag 155. The hybrid RFID tag 110 is configured to receive a sensor signal from a sensor 115 that is coupled to a monitored object 120. The hybrid RFID tag 125 is configured to receive a sensor signal from a sensor 130 that is coupled to a monitored object 135. The hybrid RFID tag 140 is configured to receive a sensor signal from a sensor 145 that is coupled to a monitored object 150. The hybrid RFID tag 155 is configured to receive a sensor signal from a sensor 160 that is coupled to a monitored object 165. In some implementations, a sensor may be provided along with a hybrid RFID tag in a single package such as, for example, both mounted on a common substrate.

In an example embodiment in accordance with the disclosure, each of the hybrid RFID tags is attached to an object in a vehicle for sensing various states of the object. More particularly, in an example implementation, the hybrid RFID tag 110 is attached to a first seat that is detachably mounted in the vehicle. The first seat may be, for example, one of seven seats provided in a van for seating seven occupants. The first seat and/or other seats may be removed at times, so as to make room for transporting objects instead of people, such as, for example, for transporting a suitcase, a package, or a large piece of hardware.

The first seat may be removed, for example, by uncoupling a latch that is used to attach to the first seat to an anchor element on a floorboard of the vehicle. The first seat is the monitored object 120 in this example and the sensor 115 is configured to sense the uncoupling of the latch and to propagate a sensor signal to the hybrid RFID tag 110. The hybrid RFID tag 110 responds to receiving the sensor signal by transmitting an RF signal to the RFID reader 105. The RFID reader 105 interprets information contained in the RF signal received from the hybrid RFID tag 110 and informs the computer 170 of a removal status of the first seat. The computer 170 can be a vehicle computer or any of various other computers that may, for example, update an inventory of components present in the vehicle and/or perform other operations based on the removal status of the seat. The procedure for detecting the removal of a seat may be applicable to detecting a placement of the first seat in the vehicle as well. The hybrid RFID tag 125 and sensor 130 may be similarly configured to monitor a status of a second seat in the vehicle, the hybrid RFID tag 140 and sensor 145 may be configured to monitor a status of a third seat in the vehicle, and so on.

In another example implementation, one or more hybrid RFID tags and associated sensors may be configured to detect the status of other types of objects in the vehicle and/or environmental factors in the vehicle. The environmental factors in the vehicle can include, for example, cabin temperature, air flow, and a seat belt use. In the case of cabin temperature, the sensor 115 may provide a sensor signal corresponding to a temperature in the cabin of the vehicle and the hybrid RFID tag 110 may forward the information via an RF signal to the RFID reader 105. The RFID reader 105 then communicates with the computer 170 (a vehicle computer, for example) to allow the computer 170 to automatically adjust the cabin temperature to a present value. Air flow in the vehicle may be similarly controlled by the vehicle computer based on a sensor signal corresponding to air flow in the cabin of the vehicle. In the case of the seat belt use scenario, the sensor 115 may provide a sensor signal corresponding to a status of a seat belt that is for intended for use by a passenger of the vehicle. The passenger may be seated in a seat but may not have buckled in. The hybrid RFID tag 110 may forward the information via an RF signal to the RFID reader 105. The RFID reader 105 then communicates with the computer 170 (a vehicle computer, for example) to allow the computer 170 to prevent the vehicle from being started until the passenger buckles up by use of the seat belt.

In yet another example implementation, the sensors may be eliminated and one or more hybrid RFID tags may be attached directly to various objects in the vehicle (such as for example, the seats in the vehicle). In this scenario, the hybrid RFID tag provides the RFID reader 105 with a tag identification (tag ID) when polled by the RFID reader 105 to indicate that the object (a seat, for example) is present in the vehicle. The RFID reader 105 may assume that the object (the seat, for example) is not present in the vehicle when no tag ID is received in response to the polling by the RFID reader 105.

The wireless configuration of the example RFID system 100 offers certain advantages such as, for example, eliminating the need to provide wired connections between a vehicle computer and various sensors in the vehicle. Installing wired connections in a vehicle can entail cost penalties, such as costs associated with providing additional wires in a wire harness for sensor applications (either during manufacture of the vehicle or during post-manufacture retrofitting procedures). The wireless configuration of the example RFID system 100 also offers other advantages such as, for example, allowing hybrid RFID tags to be added, removed, or repositioned upon various objects inside a vehicle without requiring wiring changes to the wire harness of the vehicle.

Additional advantages may be derived by applying certain operational procedures to the RFID system 100 in accordance with the disclosure. These procedures, which may be directed at addressing certain disadvantages in some RFID systems, may, for example, eliminate signal collisions that can occur if two or more hybrid RFID tags transmit RF signals concurrently to the RFID reader 105, minimize RF radiation from the hybrid RFID tags, and reduce a response time for the hybrid RFID tags to respond to queries from the RFID reader 105.

The operational procedures that may be applied to the RFID system 100 may be broadly categorized as a first mode of operation when an RFID tag operates as a passive RFID tag and a second mode of operation when the RFID tag operates as an active RFID tag. The first mode of operation can include the RFID reader 105 implementing a polling procedure to query the various RFID tags one at a time and invoke an individual response from each RFID tag when polled. In one example of such a polling procedure, the RFID reader 105 transmits an RF signal query directed to the hybrid RFID tag 110. The hybrid RFID tag 110 harvests the RF signal to produce a DC voltage for powering the hybrid RFID tag 110. The harvested DC voltage is coupled into a capacitor (not shown) at a slow-charging rate so as to avoid a capacitor inrush current causing an abrupt drop in power supply voltage. A controller chip (not shown) in the hybrid RFID tag 110 can execute some RFID functions at this time. An example RFID function involves transmission of an RF signal response to the RFID reader 105. The RF signal is transmitted while the capacitor is being charged at the slow-charging rate, thereby providing a fast response to the RF signal query from the RFID reader 105. The capacitor is then charged at a fast-charging rate for storing a reserve charge. The reserve charge can be subsequently used by the hybrid RFID tag 110 to execute some RFID functions that are typically performed by an active RFID tag in the absence of an RF signal from the RFID reader 105. An example RFID function involves transmission of an RF signal from the hybrid RFID tag 110 to the RFID reader 105 to provide information regarding a change in status of a monitored object.

After completion of communications with the hybrid RFID tag 110, the RFID reader 105 may continue with the polling procedure by communicating with the hybrid RFID tag 125, followed by other hybrid RFID tags. The illustration in FIG. 1 shows an example polling sequence where the various hybrid RFID tags are queried sequentially. In other implementations, the RFID reader 105 may communicate with the various hybrid RFID tags non-sequentially and/or at various times (periodically, intermittently, or on as-needed basis). The polling procedure eliminates collisions that may occur if two or more hybrid RFID tags transmit RF signals simultaneously back to the RFID reader 105.

Figure 2:
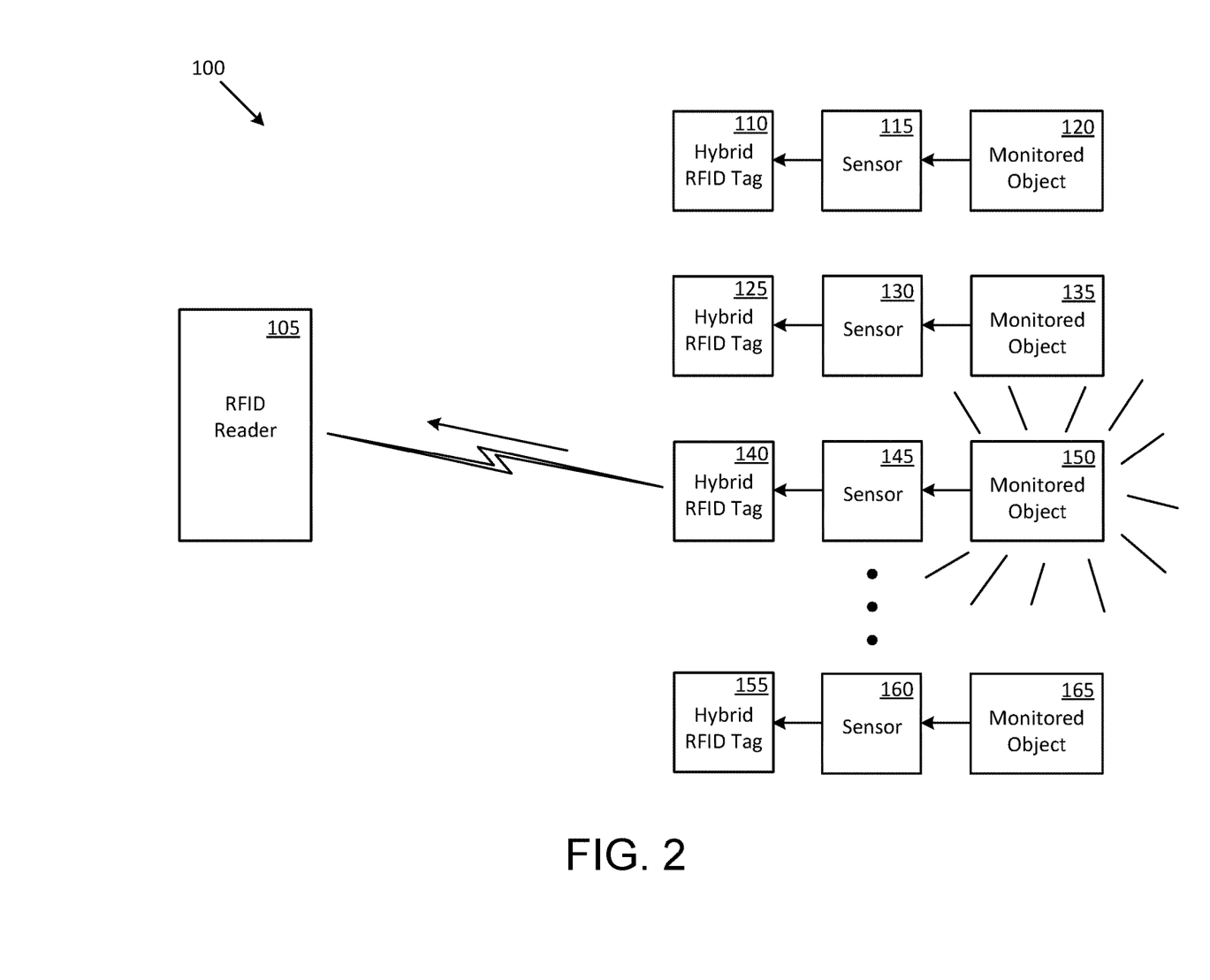
FIG. 2 illustrates a second mode of operation of an example RFID system in accordance with an embodiment of the disclosure.

FIG. 2 illustrates a second mode of operation of the RFID system 100 in accordance with an embodiment of the disclosure. In the second mode of operation, each hybrid RFID tag of the RFID system 100 is configured to operate as an active RFID tag when not receiving an RF signal from the RFID reader 105. The second mode of operation is generally executed after completion of the first mode of operation described above. Specifically, the second mode of operation is generally executed after a reserve charge is accumulated in a storage capacitor by harvesting an RF signal transmitted by the RFID reader 105.

During the second mode of operation, a hybrid RFID tag, such as, for example, the hybrid RFID tag 140, may minimize consumption of the reserve charge present in the capacitor, by placing at least some components of the hybrid RFID tag 110 in a low-power operating condition or in a sleep condition. However, in accordance with an embodiment of the disclosure, the reserve amount of power stored in the capacitor may be used to power the sensor 145, which in this example, is an active device. Some other sensors of the RFID system 100 can be passive devices.

The sensor 145 may produce a sensor signal upon detecting a change in state of the monitored object 150 (such as, for example, a seat belt being unbuckled from a seatbelt clip or disengaging of a latch for removal of a seat from the vehicle). The sensor signal is propagated to the hybrid RFID tag 140 and the components of the hybrid RFID tag 140 that were placed in a low-power or sleep condition are powered up. The reserve charge stored in the capacitor now operates as an exclusive source of power to the hybrid RFID tag 140. In this role, the capacitor may be viewed as a functional equivalent of a battery of a conventional active RFID tag. The hybrid RFID tag 140 transmits an RF signal to the RFID reader 105 to inform the RFID reader 105 of the change in state of the monitored object 150 (change in mechanical status of a clip or latch, change in cabin temperature, change in air flow, etc.).

Figure 3:
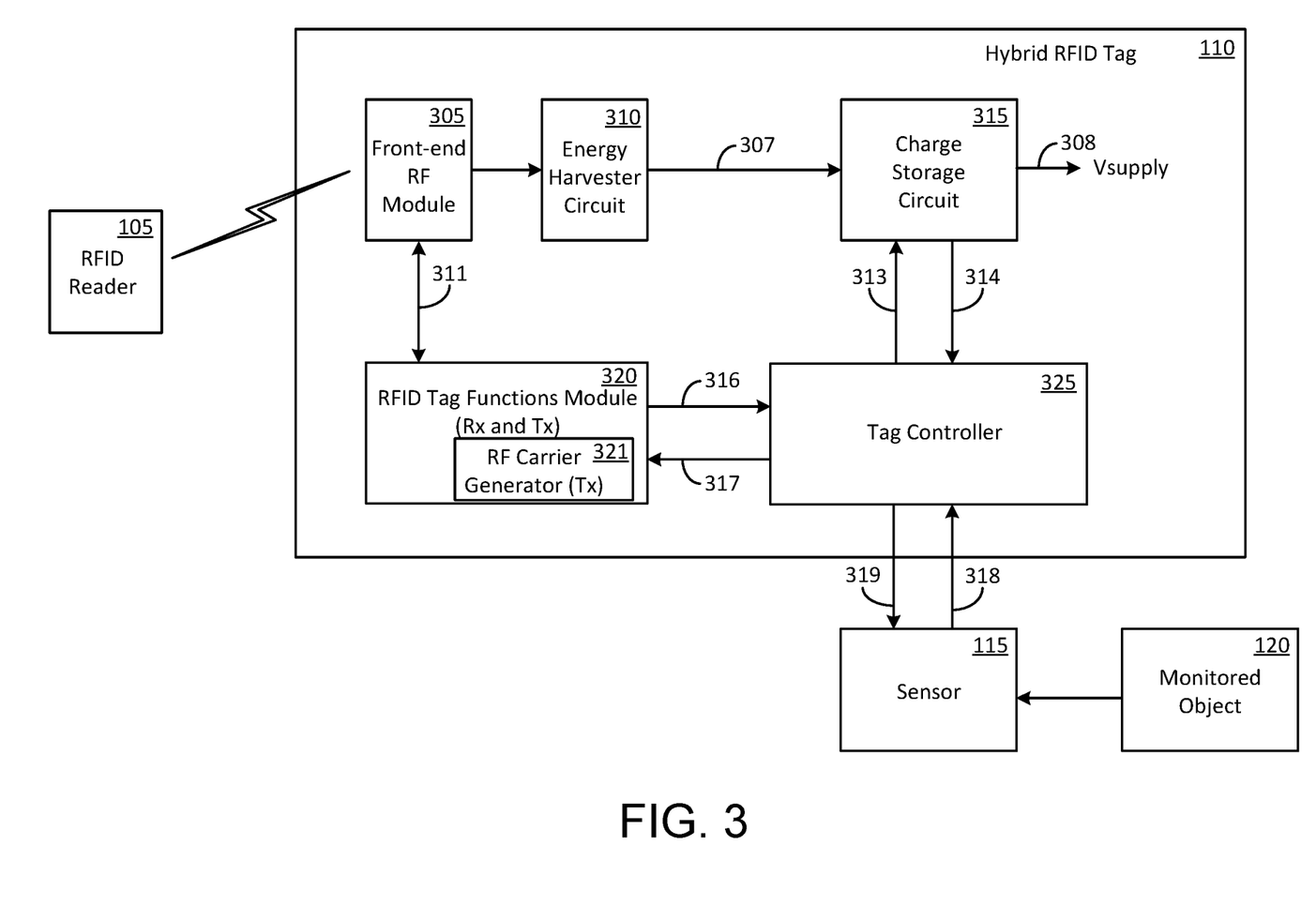
FIG. 3 shows some example components that may be included in a hybrid RFID tag in accordance with an embodiment of the disclosure.

FIG. 3 shows some example components that may be included in the hybrid RFID tag 110 in accordance with an embodiment of the disclosure. It must be understood that the hybrid RFID tag 110 is being used as an example here and the description is equally applicable to other hybrid RFID tags of the RFID system 100. The hybrid RFID tag 110 can include components such as a front-end RF module 305, an energy harvester circuit 310, a charge storage circuit 315, an RFID tag functions module 320, and a tag controller 325.

The front-end RF module 305 can include an antenna and associated circuit components configured to receive an RF signal from the RFID reader 105 and produce therefrom, an alternating current (AC) signal that is coupled into the energy harvester circuit 310. The energy harvester circuit 310 can include a circuit such as, for example, a DC voltage regulator and a multi-stage Dickson charge pump that is configured to convert the RF signal received by the front-end RF module 305 into a DC voltage. The multi-stage Dickson charge pump boosts the DC voltage to a desired voltage level that can be used to operate components of the hybrid RFID tag 110 such as, for example, the RFID tag functions module 320. The front-end RF module 305 may also interact with the RFID tag functions module 320 (via a line 311) for performing a demodulation operation upon the RF signal received from the RFID reader 105. Information obtained via the demodulation operation may be communicated to the tag controller 325 (via a line 316). In an example scenario, the information may be an RF signal query from the RFID reader 105 seeking a status of the monitored object 120.

Another function that may be performed by the RFID tag functions module 320 is to modulate an RF carrier for embedding information to be transmitted to the RFID reader 105 via the front-end RF module 305. The RF carrier may be generated by an RF carrier generator 321. The information embedded into the RF carrier may be provided to the RFID tag functions module 320 by the tag controller 325 (via a line 317). In an example scenario, the information embedded into the transmitted RF signal may be a response to an RF signal query received from the RFID reader 105. The modulated RF signal may be conveyed to the front-end RF module 305 (via the line 311) for transmitting to the RFID reader 105.

The charge storage circuit 315 receives the DC voltage produced by the energy harvester circuit 310 (via the line 307) and stores the charge in a capacitor (not shown) using a dual-speed capacitor charging process (a slow-charging rate followed by a fast-charging rate). The charge stored in the capacitor is used to power various components of the hybrid RFID tag 110 (via the line 308, for example) during the second mode of operation when the hybrid RFID tag 110 operates as an active RFID tag.

The tag controller 325, which can include a processor 450 and a memory 455, interacts with the charge storage circuit 315 via one or more lines (such as the line 313 and the line 314) during the dual-speed capacitor charging procedure. The nature of the signals propagated over these lines is described below in more detail.

The tag controller 325 may also interact with the sensor 115 via signals propagated over one or more lines, such as, for example, a line 319 over which the tag controller 325 may propagate a signal or a DC voltage to place the sensor 115 in an active state for monitoring the monitored object 120. The sensor 115 propagates a signal to the tag controller 325 (over a line 318) when the monitored object 120 transitions from one state to another state (such as, for example, when a seat belt buckle is disengaged from a retaining clip). The memory 455, which is one example of a non-transitory computer-readable medium, may be used to store computer-executable instructions, that, when executed by the processor 450 performs various operations described above, as well as other operations that are associated with the hybrid RFID tag 110.

Figure 4:
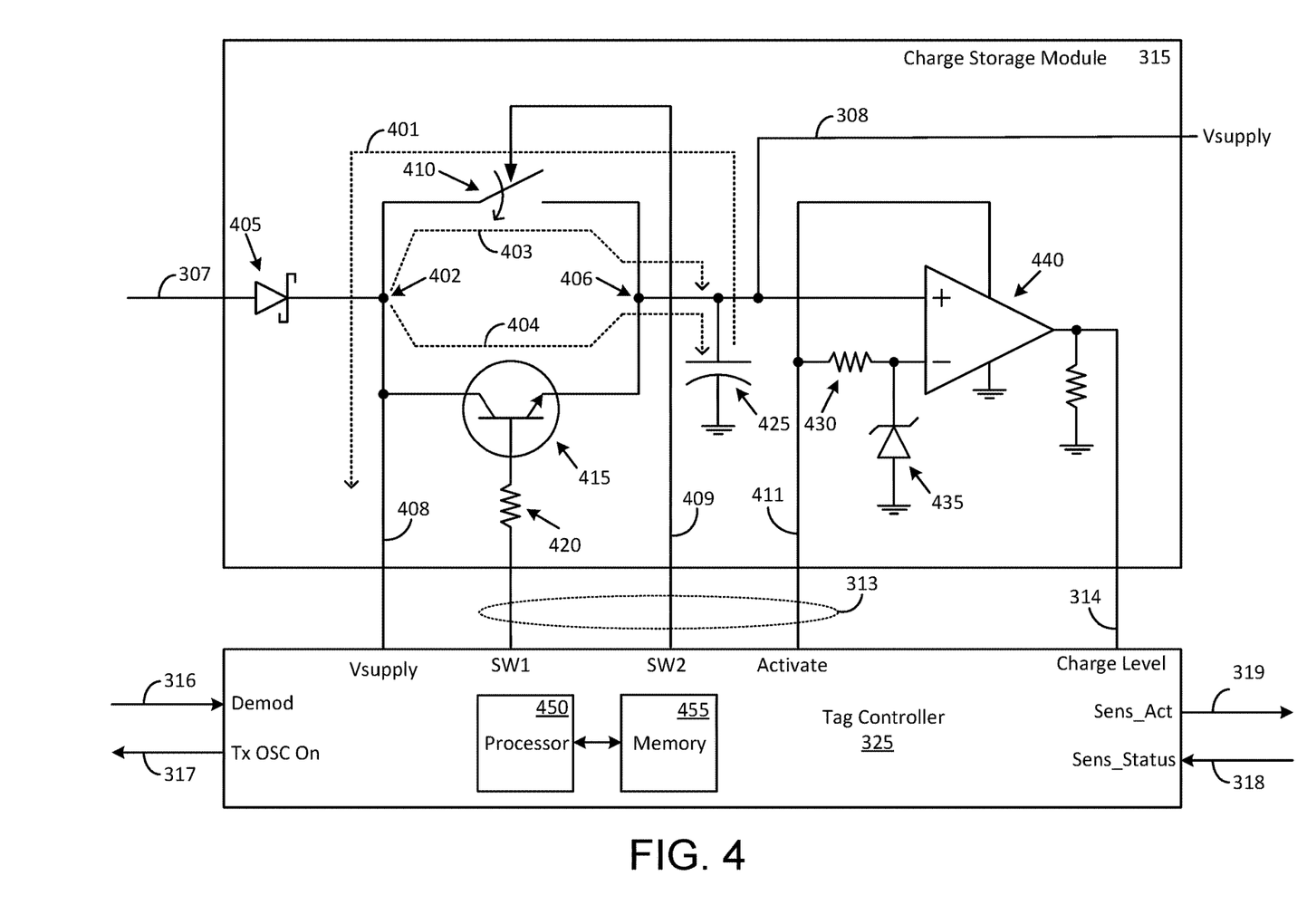
FIG. 4 shows an example charge storage circuit coupled to an example tag controller in accordance with an embodiment of the disclosure.

FIG. 4 shows an example configuration of the charge storage circuit 315 coupled to the tag controller 325 in accordance with an embodiment of the disclosure. The charge storage circuit 315 receives a DC voltage from the energy harvester circuit 310, via the line 307. The DC voltage is propagated through a Schottky barrier diode 405 to a node 402 of a dual-speed capacitor charging circuit. The Schottky diode 405 offers a low forward voltage drop, thereby optimizing unidirectional charge flow into the charge storage circuit 315 while blocking charge movement in a reverse direction. Blocking charge movement in a reverse direction minimizes minimizing leakage through the energy harvester circuit 310 (particularly when the hybrid RFID tag 110 is in a low-power operating condition or in a sleep condition).

In an example implementation, the DC voltage provided on line 307 is at 3.3V. The 3.3V DC voltage may be used to power some devices such as, for example, the tag controller 325 that is powered from the node 402, via the line 408.

The dual-speed capacitor charging circuit includes a first charging circuit that charges a capacitor 425 at a slow charging rate during a first step of a dual-speed capacitor charging process. The slow charging rate is executed by controlling a level of current conduction through a transistor 415 and into the capacitor 425 (illustrated by a current flow 404). The slow charging rate is selected to avoid an initial inrush current into the capacitor 425 from causing an abrupt power supply voltage drop at the node 402. Such a drop would adversely affect the operation of the tag controller 325 and prevent the tag controller 325 from rapidly responding to the RF signal query received from the RFID reader 105.

In an example implementation, the transistor 415 is a bipolar transistor configured as a current-controlled switch and the capacitor 425 has a capacitance value that ranges from about 1 mF to about 5 mF. The capacitance value can be different in other implementations. A time constant associated with the slow-charging rate may be defined by a product of the on-resistance of the transistor 415 and the capacitance of the capacitor 425. The on-resistance of the transistor 415 may be varied by controlling an amplitude of the collector-to-emitter current flow through the transistor 415. The collector-to-emitter current flow may be varied by varying an amplitude of a current flowing into a base terminal of the transistor 415 (via a resistor 420). In an example implementation, the base current is sourced from a terminal labeled SW1 of the tag controller 325.

The DC voltage present at a node 406 represents a level of charge stored in the capacitor 425 at any given time and can be detected by a voltage level detector circuit. The voltage level detector circuit can include a comparator 440 that is configured to compare the DC voltage at the node 406 to a threshold reference voltage. The comparator 440 outputs a trigger signal when the charge accumulation in the capacitor 425 has resulted in the DC voltage at the node 406 exceeding the threshold reference voltage. The threshold reference voltage may be provided by a Zener diode 435, which, in the illustrated example, receives power from the tag controller 325 (via a line 411 and a resistor 430). The comparator 440 circuit produces the trigger signal based on comparing the DC voltage at the node 406 to the threshold reference voltage over a period of time during which the transistor 415 operates as a current-controlled switch for controlling the current flow 404 for charging the capacitor at the slow charging rate.

Upon receiving the trigger signal (via the line 314), the tag controller 325 turns off the transistor 415. The transistor 415 may be turned off by terminating current flow into the base terminal of the transistor 415 from the terminal labeled SW1 of the tag controller 325. Terminating the base current results in termination of the current flow 404 through the transistor 415. The tag controller 325 then issues a switch control signal (via a line 409, from SW2) to the bi-directional switch 410. In this example implementation, the bi-directional switch 410 is a solid-state switch that remains in an open state when the capacitor 425 is being charged at the slow charging rate and transitions to a closed state upon receiving the switch control signal from the tag controller 325. The closed state of the bi-directional switch 410 results in a current flow 403 from the node 402 to the node 406 through a fast-charging path of the dual-speed capacitor charging circuit. Current flow 404 through the slow-charging path of the dual-speed capacitor charging circuit (via the transistor 415) is not present at this time.

The on-resistance of the bi-directional switch 410 is a fixed resistance that is lower than the controlled variable on-resistance of the transistor 415, thereby allowing charging of the capacitor 425 at a fast-charging rate. Charging of the capacitor 425 at the fast-charging rate constitutes the second step of the dual-speed capacitor charging process. A time constant associated with the fast-charging rate may be defined by a product of the on-resistance of the bi-directional switch 410 and the capacitance of the capacitor 425.

Fast charging of the capacitor 425 allows a reserve charge to be stored in the capacitor 425 over a period of time during which the hybrid RFID tag 110 is receiving an RF signal from the RFID reader 105. When the RF signal is no longer present, the reserve charge stored in the capacitor 425 may be used to power various components of the hybrid RFID tag 110. For example, the reserve charge stored in the capacitor 425 may be used to provide power to the tag controller 325 (as illustrated by a current flow 401 from the capacitor 425 to a voltage supply terminal of the tag controller 325).

In an example application, power consumption in the hybrid RFID tag 110 may be reduced at this time by placing various components (such as, for example, the tag controller 325) in a sleep mode. In some cases, the reserve charge stored in the capacitor 425 may be used to power some components of the hybrid RFID tag 110 as well as to power some devices coupled to the hybrid RFID tag 110 (such as, for example, the sensor 115).

Figure 5:
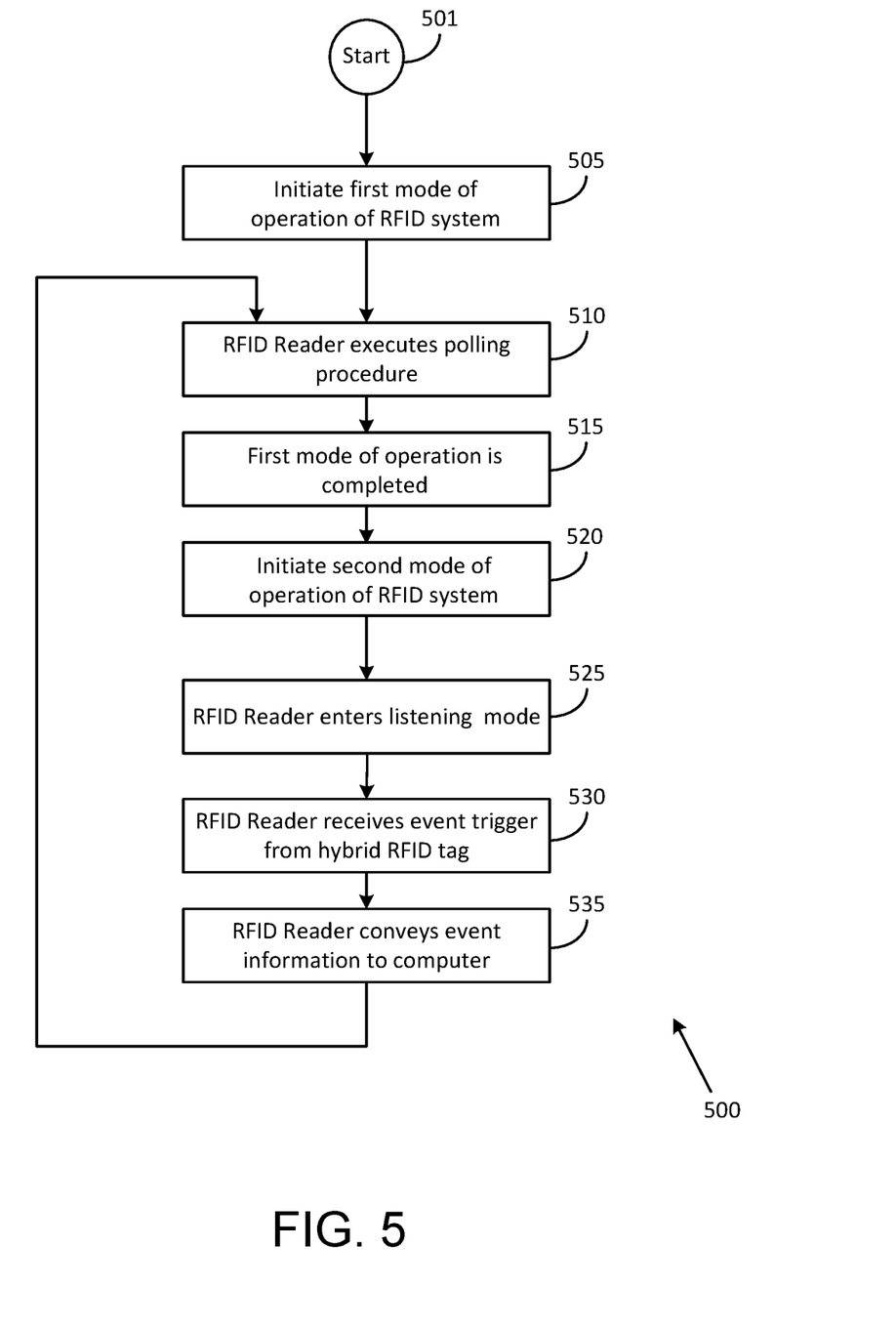
FIG. 5 shows a flowchart of a method of operation of an example RFID system in accordance with an embodiment of the disclosure.

FIG. 5 shows a flowchart 500 of a method of operation of an RFID system in accordance with an embodiment of the disclosure. The flowchart 500 illustrates a sequence of operations that can be implemented in hardware, software, or a combination thereof. In the context of software, the operations represent computer-executable instructions stored on one or more non-transitory computer-readable media such as, the memory 455 in the tag controller 325 of the hybrid RFID tag 110 or in a memory of the computer 170 that is coupled to the RFID reader 105, that, when executed by one or more processors such as the processor 450 in the tag controller 325 of the hybrid RFID tag 110, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

Operations of the flowchart 500 begin at block 501. In an example scenario where the RFID system 100 is provided in a vehicle, the operations may begin when an engine of the vehicle is started. The computer 170 (a vehicle computer in this case) is aware of the engine start and may communicate with the RFID reader 105 to initiate operations indicated in subsequent blocks of the flowchart 500.

At block 505, a first mode of operation (such as the one illustrated in FIG. 1) is initiated by an RFID reader. As a part of the first mode of operation, at block 510, the RFID reader executes a polling procedure to communicate with n" (n≥1) hybrid RFID tags of the RFID system. At block 515, the first mode of operation is completed. At block 520, a second mode of operation is initiated by the RFID reader. As a part of the second mode of operation, at block 525, the RFID reader enters a listening mode of operation. At this time the RFID reader does not transmit any RF signals to any of the hybrid RFID tags. The elimination of RF signal transmissions at this time in accordance with disclosure provides certain advantages such as, for example, a reduction in electromagnetic interference (EMI) inside the cabin of the vehicle and a reduction in RF exposure to occupants of the vehicle.

At block 530, the RFID reader receives an event trigger from a hybrid RFID tag (such as, for example, the hybrid RFID tag 140 shown in FIG. 2 and described above). At block 535, the RFID reader conveys event information received from the hybrid RFID tag to a vehicle computer. The event information may pertain to unbuckling of a seat belt in the vehicle. The vehicle computer may perform an operation based on the event information, such as, for example, issue a seat belt warning on an infotainment system of the vehicle.

After conveying the event information to the vehicle computer, the RFID reader may revert to executing a polling procedure (as indicated in block 510) followed by execution of additional actions (indicated in subsequent blocks). The polling procedure allows the vehicle computer to not only identify the specific hybrid RFID tag that has received the event trigger (the hybrid RFID tag 140, for example) but also allow identification of any other hybrid RFID tags that may have received event triggers. Additionally, the polling procedure leads to a replenishment of reserve charge in the capacitors of all of the polled hybrid RFID tags.

Figure 6:
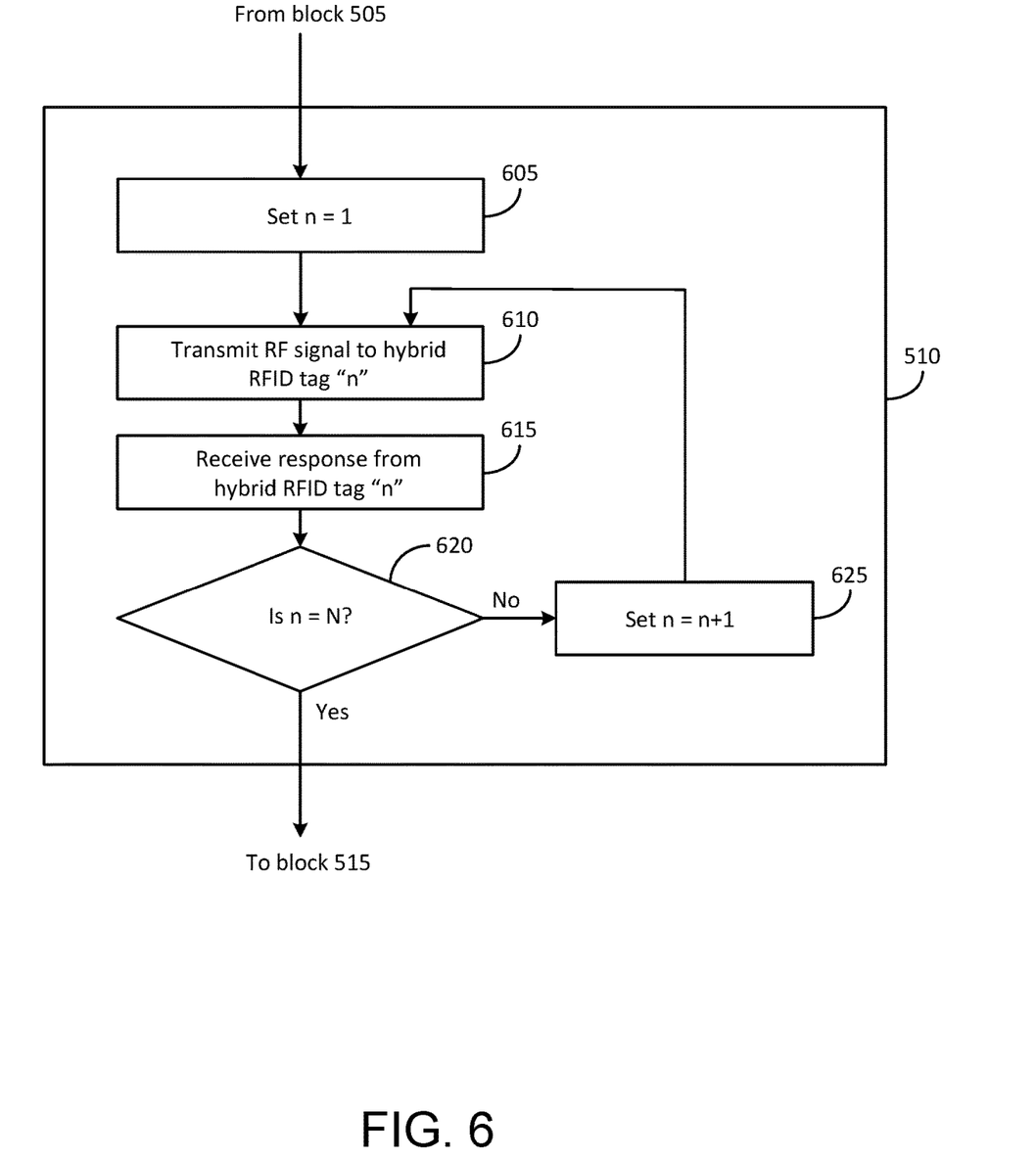
FIG. 6 shows a flowchart of a method step that is a part of the flowchart shown in FIG. 5.

FIG. 6 shows a flowchart of some details pertaining to a method step that is indicated by block 510 in the flowchart 500 described above. At block 605, the RFID reader sets a counter to an initial value (n=1). At block 610, the RFID reader transmits an RF signal to a first hybrid RFID tag (such as, for example, the hybrid RFID tag 110 shown in FIG. 1). The first hybrid RFID tag harvests a DC voltage from the RF signal at this time and accumulates a reserve charge in a capacitor (such as, for example, the capacitor 425 shown in FIG. 4). The reserve charge is used to power the first hybrid RFID tag later on for transmitting an RF signal upon occurrence of an event trigger (as described above with reference to block 530). In an embodiment in accordance with the disclosure, each of "N" hybrid RFID tags that may be present inside a vehicle is assigned a unique identification number. The unique identification number may be stored in memory, such as, for example, in the memory 455 of the tag controller 325 of the hybrid RFID tag 110, an/or in a memory of the RFID reader 105.

At block 615, the RFID reader receives a response from the first hybrid RFID tag. The assigned ID number may be used by the RFID reader to identify the first hybrid RFID tag transmitting the response and to determine a status of a monitored object coupled to a sensor associated with the first hybrid RFID tag. In some cases, the information contained in the response may be conveyed by the RFID reader to a computer, such as, for example, to generate, to verify, or to update, an inventory of monitored objects in a vehicle and/or a status of the monitored objects in the vehicle.

At block 620, a determination is made whether the count "n" is equal to "N," where "N" corresponds to the number of hybrid RFID tags present in the vehicle. In an example scenario, N=7 when seven hybrid RFID tags are attached to seven seats in the vehicle. If "n" is not equal to "N," at block 625, "n" is incremented by 1, and the operation indicated in block 610 is executed, followed by subsequent operations indicated in subsequent blocks.

If "n" is equal to "N," which is an indication that all the hybrid RFID tags have been polled, the operation indicated in block 515 and subsequent blocks are performed.

Implementations of the systems, apparatuses, devices, and methods disclosed herein may comprise or utilize one or more devices that include hardware, such as, for example, one or more processors and memory, as discussed herein. An implementation of the devices, systems, and methods disclosed herein may communicate over a wireless network. A "network" is defined as one or more data links that enable the transport of electronic data between electronic devices.

When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, electromagnetic, optical, and/or other types of storage media. In the context of this document, a "non-transitory computer-readable medium" can be, for example but not limited to, an electronic, electromagnetic, optical, electromagnetic, infrared, or semiconductor system, apparatus, or device. More specific examples (a non-exhaustive list) of the computer-readable medium would include the following: a portable computer diskette (electromagnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method of operation of a hybrid radio-frequency identification (RFID) tag, the method comprising:
   receiving, from an RFID reader, a first radio-frequency (RF) signal;
   executing a first mode of operation upon receiving the first RF signal, the first mode of operation comprising:
      harvesting the first RF signal to produce a direct current (DC) voltage;
      providing power to a first component of the hybrid RFID tag based on the DC voltage;
      executing, by the first component, a demodulation operation on the first RF signal when powering of the first component by the DC voltage;
      coupling the DC voltage to a capacitor through a second component of the hybrid RFID tag;
      monitoring a first amount of charge accumulated in the capacitor;
      terminating coupling of the DC voltage to the capacitor through the second component when the first amount of charge accumulated in the capacitor exceeds a threshold charge level;
      coupling the DC voltage to the capacitor through a third component of the hybrid RFID tag; and
      storing a reserve amount of charge in the capacitor after coupling the DC voltage to the capacitor through the third component;
   terminating the first mode of operation when the RF signal is no longer received;
   receiving, after the first mode of operation is terminated, a sensor signal from a sensor; and
   executing a second mode of operation based on receiving the sensor signal, the second mode of operation comprising:
      providing power to a fourth component of the hybrid RFID tag based on the reserve amount of charge stored in the capacitor; and performing, by the second component, a second operation associated with transmitting a second RF signal from the hybrid RFID tag to the RFID reader.

2. The method of claim 1, wherein the third component is configured to provide charging of the capacitor at a first charging rate, and the fourth component is configured to provide charging of the capacitor at a second charging rate that is faster than the first charging rate.

3. The method of claim 2, wherein the first charging rate is selected to prevent the DC voltage from dropping below a threshold voltage level when the first component is performing the demodulation operation upon the first RF signal.

4. The method of claim 2, wherein the third component is a current-controlled switch configured to provide a first level of current conduction into the capacitor, and wherein the fourth component is a bi-directional switch configured to provide a second level of current conduction into the capacitor, the second level of current conduction higher than the first level of current conduction.

5. The method of claim 4, wherein the current-controlled switch is a bipolar transistor configured to provide the first level of current conduction based on control of an amplitude of current flowing into a base terminal of the bipolar transistor and wherein the bi-directional switch is a solid-state switch.

6. The method of claim 1, wherein the second component is an RF carrier generator that generates an RF carrier for transmission of the second RF signal from the hybrid RFID tag to the RFID reader.

7. The method of claim 4, wherein providing power to the second component of the hybrid RFID tag based on the reserve amount of charge stored in the capacitor comprises:
retaining the bi-directional switch in an on condition to couple the capacitor to the first component.

8. A method of operation of a hybrid radio-frequency identification (RFID) tag, the method comprising:
receiving, from an RFID reader, a first radio-frequency (RF) signal;
executing a first mode of operation based on receiving the first RF signal, the first mode of operation comprising:
harvesting the first RF signal to produce a direct current (DC) voltage;
providing power to a first component of the hybrid RFID tag based on the DC voltage;
coupling the DC voltage to a capacitor through a first charging circuit that supports charging of the capacitor at a first charging rate, the first charging rate selected to prevent the DC voltage from dropping below a threshold voltage level over a first period of time;
executing, by the first component, during the first period of time, a demodulation operation upon the first RF signal; and
terminating coupling of the DC voltage to the capacitor through the first charging circuit when a first amount of charge accumulated in the capacitor exceeds a threshold charge level;
coupling the DC voltage to the capacitor through a second charging circuit that supports charging of the capacitor at a second charging rate that is faster than the first charging rate; and
terminating the first mode of operation when the RF signal is no longer received by the hybrid RFID tag, wherein the first charging circuit comprises a current-controlled switch configured to provide a first level of current conduction into the capacitor, and the second charging circuit comprises a bi-directional switch configured to provide a second level of current conduction into the capacitor, the second level of current conduction higher than the first level of current conduction.

9. The method of claim 8, further comprising:
receiving, after the first mode of operation is terminated, a sensor signal from a sensor; and
executing a second mode of operation based on receiving the sensor signal, the second mode of operation comprising:
providing power to the first component and/or a second component of the hybrid RFID tag based on a reserve amount of charge stored in the capacitor at the second charging rate; and
performing, by the first component and/or the second component, a second operation associated with transmitting a second RF signal from the hybrid RFID tag to the RFID reader.

10. The method of claim 8, wherein the bi-directional switch is a solid-state switch and the current-controlled switch is a bipolar transistor configured to provide the first level of current conduction based on a control signal applied to a base terminal of the bipolar transistor.

11. A hybrid radio-frequency identification (RFID) tag comprising:
a radio-frequency (RF) front-end circuit configured to receive a first RF signal from an RFID reader;
an energy harvester circuit coupled to the RF front-end circuit, the energy harvester circuit configured to produce a direct current (DC) voltage by harvesting the first RF signal;
a tag controller that is powered by the DC voltage produced by the energy harvester circuit;
a latch attached to a monitored object;
a sensor configured to produce a sensor signal based on a status of the latch and to couple the sensor signal into the tag controller; and
a charge storage circuit comprising:
a capacitor for storing a charge based on the DC voltage;
a current-controlled switch that operates to provide a first level of current conduction into the capacitor in response to a first control signal provided by the tag controller to the current-controlled switch; and
a bi-directional switch that operates to provide a second level of current conduction into the capacitor in response to a second control signal provided by the tag controller to the bi-directional switch.

12. The hybrid RFID tag of claim 11, wherein the current-controlled switch is a bipolar transistor, wherein the first control signal is a current that is coupled into a base terminal of the bipolar transistor, wherein the bi-directional switch is a solid-state switch, and wherein the second control signal is a switch control voltage coupled into a switch activation terminal of the solid-state switch.

13. The hybrid RFID tag of claim 12, further comprising:
a comparator circuit configured to produce a trigger signal based on comparing a charge level in the capacitor to a threshold charge level over a period of time during which the current-controlled switch is providing the first level of current conduction into the capacitor.

14. The hybrid RFID tag of claim 13, wherein the tag controller is configured to execute a first mode of operation based on receiving the first RF signal, the first mode of operation comprising:
executing an RF demodulation operation upon the first RF signal;

activating the current-controlled switch to provide the first level of current conduction into the capacitor; and responding to receiving the trigger signal from the comparator circuit by de-activating the current-controlled switch and activating the bi-directional switch.

15. The hybrid RFID tag of claim 14, wherein the tag controller is further configured to execute a second mode of operation based on receiving a sensor signal from a sensor, the second mode of operation comprising:

transmitting a second RF signal from the hybrid RFID tag to the RFID reader to inform the RFID reader of the sensor signal.

16. The hybrid RFID tag of claim 15, further comprising:

an RF carrier generator that generates an RF carrier that is modulated by the tag controller to produce the second RF signal that is transmitted to the RFID reader.

17. The hybrid RFID tag of claim 11, wherein the monitored object is a seat that is detachably mounted in a vehicle, and wherein the status of the latch changes from a first state to a second state when the seat is detached.

* * * * *